United States Patent
Houseworth et al.

(10) Patent No.: US 10,325,081 B2
(45) Date of Patent: Jun. 18, 2019

(54) ONLINE IDENTITY SCORING

(71) Applicant: HRB Innovations, Inc., Las Vegas, NV (US)

(72) Inventors: Jason Houseworth, Olathe, KS (US); Mark Ciaramitaro, Leawood, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 116 days.

(21) Appl. No.: 15/240,202

(22) Filed: Aug. 18, 2016

(65) Prior Publication Data

US 2018/0054733 A1 Feb. 22, 2018

(51) Int. Cl.
*G06F 21/32* (2013.01)
*G06F 21/45* (2013.01)
*H04L 29/06* (2006.01)

(52) U.S. Cl.
CPC ............. *G06F 21/32* (2013.01); *G06F 21/45* (2013.01); *H04L 63/08* (2013.01); *H04L 63/0861* (2013.01); *H04L 63/102* (2013.01); *H04L 63/107* (2013.01)

(58) Field of Classification Search
CPC ..................................................... G06F 21/32
USPC ............................................................ 726/7
See application file for complete search history.

(56) References Cited

U.S. PATENT DOCUMENTS

| | | | |
|---|---|---|---|
| 2004/0076120 A1* | 4/2004 | Ishidoshiro | H04W 12/06 370/252 |
| 2006/0053296 A1* | 3/2006 | Busboom | H04L 63/083 713/182 |
| 2008/0222038 A1* | 9/2008 | Eden | G06Q 20/04 705/44 |
| 2010/0242102 A1* | 9/2010 | Cross | G06F 21/32 726/7 |
| 2014/0282964 A1* | 9/2014 | Stubblefield | H04L 63/0853 726/7 |
| 2016/0352860 A1* | 12/2016 | Deb | H04L 67/306 |
| 2017/0243025 A1* | 8/2017 | Kurian | G06F 21/6245 |

* cited by examiner

*Primary Examiner* — Khalil Naghdali
(74) *Attorney, Agent, or Firm* — Erise IP, P.A.

(57) ABSTRACT

Method, media, and system for authentication of a claimant as a claimed identity. Embodiments break the authentication process into two steps. In the first step, a registrant establishes an identity profile by presenting identity documents and authentication points that can later be used to verify that they are the person who established the identity profile. Subsequently, when a claimant claims the identity in the identity profile, an identity score and an authentication score can be calculated based on the identity profile and the information provided by the claimant. The authentication score measures how likely it is that the claimant is the same person who established the identity profile. The identity score measures how likely it is that the registrant is who they are claiming to be. The identity score and the authentication score can then be combined to determine the likelihood that the claimant actually corresponds to the claimed identity.

20 Claims, 4 Drawing Sheets

ONLINE IDENTITY SCORING

BACKGROUND

1. Field

Embodiments of the invention generally relate to determining whether a person is who they claim to be and, more particularly, to providing a secure identity scoring technique that can be used even when the person is not physically present.

2. Related Art

Traditionally, identity has been verified by presenting physical, tamper-resistant identity documents such as a driver's license or passport. Because these documents are tied to the claimed identity (by including a name or other unique identifier) and to the claimant (by including a picture or other description and by virtue of being in the claimant's possession). Because such documents are tamper-resistant, it is difficult for a malicious actor to forge documents claiming a false identity.

However, transactions are increasingly carried out when the parties are not in the same physical location, such as over the Internet. This makes it significantly more difficult to authenticate the parties, because the physical documents cannot be examined. Nor are digital images (for example, digital scans) of the documents a viable alternative, because the digital images can be altered or copied and are accordingly much less secure. Accordingly, there is a need for technique to authenticate a claimant as a claimed identity that is secure and can be utilized when the parties are not in the same physical location.

SUMMARY

Embodiments of the invention address this need by breaking the authentication process into a step of establishing an identity profile linked to a claimed identity, and then authenticating the claimant as the creator of the identity profile. In particular, in a first embodiment, the invention includes a method for authenticating a claimant as a claimed identity, comprising the steps of receiving, from a registrant, a plurality of identity points for the claimed identity and a plurality of authentication points for the registrant, establishing, based on the plurality of identity points for the claimed identity and the plurality of authentication points for the registrant, an identity profile linking the registrant to a claimed identity, determining, based on the plurality of identity points for the claimed identity, an identity score for the registrant, receiving a request to authenticate the claimant, wherein the claimant claims the claimed identity, and wherein the request includes a plurality of authentication points for the claimant, validating the plurality of authentication points for the claimant against the plurality of authentication points for the registrant to determine an authentication score for the claimant, determining, based on the authentication score for the claimant and the identity score for the registrant, a confidence score for the claimant, wherein the confidence score reflects that likelihood the claimant corresponds to the claimed identity, and transmitting a response indicating an authentication result, wherein the authentication result is based on the confidence score.

In a second embodiment, the invention includes one or more non-transitory computer-readable media storing computer-executable instructions that, when executed by a computer, perform a method of authenticating a claimant as a claimed identity, the method comprising the steps of receiving, from a registrant, a plurality of identity points corresponding to the claimed identity and a plurality of authentication points for the registrant, storing, in a distributed data store, an identity profile corresponding to the registrant and including the plurality of identity points corresponding to the claimed identity and the plurality of authentication points for the registrant, receiving, from a claimant, a plurality of authentication points for the claimant, retrieving, from the distributed data store, the identity profile, validating at least some of the authentication points for the claimant against corresponding authentication points for the registrant, determining, based on the step of validating, an authentication score for the claimant, calculating, based on at least a portion of the identity points for the claimed identity, an identity score for the registrant, calculating, based at least in part on the identity score and the authentication score, a confidence score reflecting the likelihood that the claimant corresponds to the claimed identity, and authenticating the claimant as the claimed identity based on the confidence score.

In a third embodiment, the invention includes a system for authenticating a claimant as a claimed identity, comprising a registration terminal, an identity clearinghouse, and an identity terminal, wherein the registration terminal is programmed to receive at least one authentication point for the registrant and at least one of identity points for the claimed identity, and transmit the at least one authentication point for the registrant and the at least one identity point for the claimed identity to the identity clearinghouse, wherein the identity clearinghouse is programmed to receive the at least one authentication point for the registrant and the at least one identity point for the claimed identity, store the at least one authentication point for the registrant and the at least one identity point for the claimed identity in an identity data store, receive a request to authenticate a claimant as the claimed identity and at least one authentication point for the claimant, validate the at least one authentication point for the claimant against the at least one authentication point for the registrant to determine an authentication score for the claimant, determine, based on the at least one identity point for the claimed identity, an identity score for the registrant, calculate, based on the identity score for the registrant and the authentication score for the claimant, an confidence score reflecting the likelihood that the claimant corresponds to the claimed identity, based on the confidence score, transmit an authentication of the claimant to the identity terminal, and wherein the identity terminal is programmed to receive at least one authentication point for the claimant, transmit a request to authenticate the claimant including the at least one authentication point to the identity clearinghouse, and receive, from the identity clearinghouse, the authentication of the claimant.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
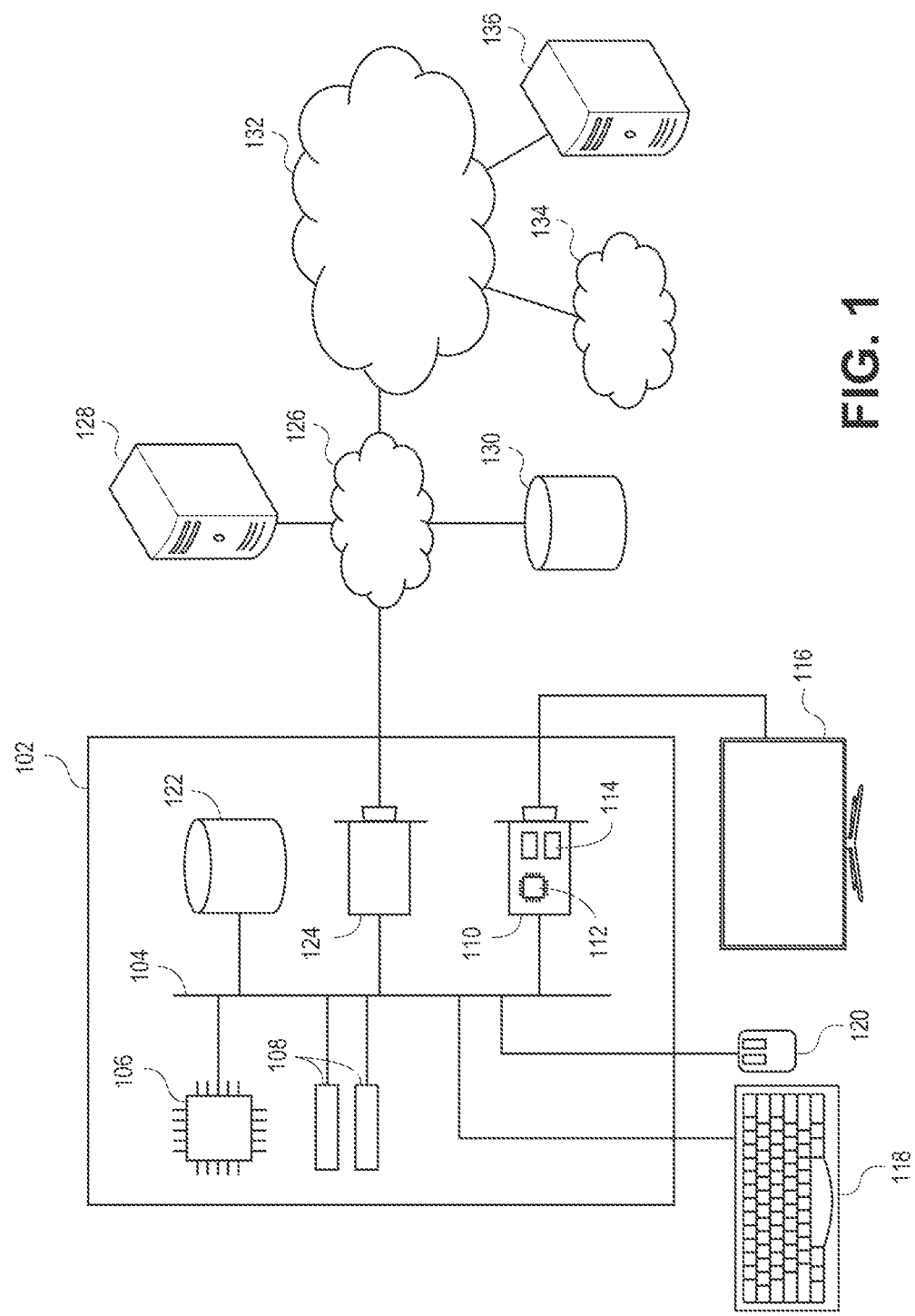
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention allow for secure, remote authentication of a claimant as a claimed identity by breaking the authentication process into two steps. In the first step, a registrant establishes an identity profile by (for example) visiting a trusted third party and presenting physical identity documents (such as, for example, a driver's license, passport, student ID, or any other form of identification). The documents presented are recorded in the identity profile. The registrant also provides authentication points that can later be used to verify that they are the person who established the identity profile (such as, for example, a password or biometric).

Subsequently, when a claimant claims the identity in the identity profile, an identity score and an authentication score can be calculated based on the identity profile and the information provided by the claimant. The authentication score measures how likely it is that the claimant is the same person who established the identity score. For example, providing a PIN created when establishing the identity profile might create a weak authentication score, while providing the PIN, and a photograph and fingerprints matching those stored in the identity profile would provide a strong authentication score. The identity score measure how likely it is that the registrant is who they are claiming to be. For example, providing a utility bill might provide a weak identity score while providing a passport, driver's license, and social security card might provide a strong identity score. The identity score and the authentication score can then be combined to form a confidence score representing the likelihood that the claimant actually corresponds to the claimed identity.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
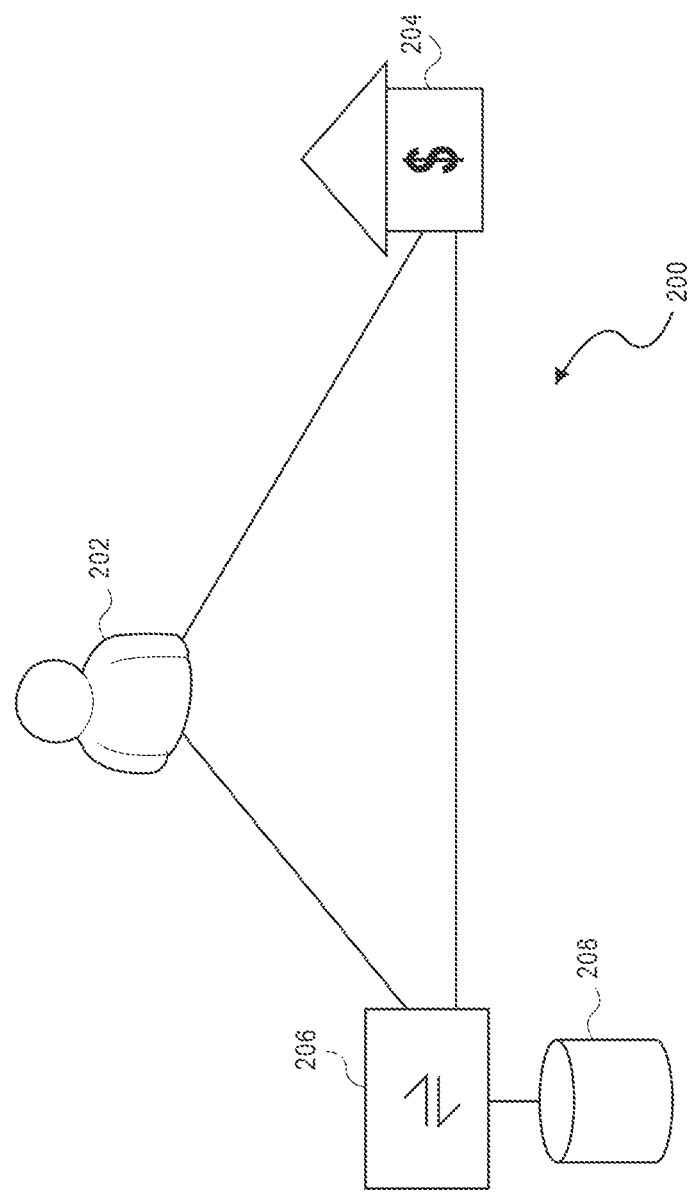
FIG. 2 depicts a system suitable for practicing the invention.

Turning now to FIG. 2, a block diagram depicting high-level components of one embodiment of the invention is depicted and referred to generally by reference numeral 200. Broadly, consumer 202 wishes to conduct a transaction with institution 204. To prevent fraud, institution 204 requires proof (to some level of confidence) that consumer 202 is who they claim to be. For example, consumer 202 may be a customer who wises to finance a vehicle purchase from an automobile dealership. Alternatively, institution 204 may be a governmental taxation authority and consumer 202 may be a taxpayer wishing to file a tax return for a refund. In still other embodiments institution 204 may be an individual and/or consumer 202 may be a juristic person. Any scenario where one party wishes to verify the identity of another party is broadly contemplated as being within the scope of the invention.

Traditionally, to conduct such identity verifications, consumer 202 will present physical identity documents (which usually include security features to make tampering or forgery apparent) to institution 204. However, this limits the scope of identity-verified transactions to those scenarios where consumer 202 can be physically present at institution 204. Remotely transmitting these documents (by, for example, mailing a photocopy or emailing a scanned image) compromises the confidence level of the identity verification process, because the duplicate will necessarily not include the security features of the original documents, making them much easier to alter. For example, a photocopy of a passport is much easier to forge or alter than the passport itself.

To address this problem and enable identity verifications in a wider variety of scenarios, embodiments of the invention provide for identity clearinghouse 206. Identity clearinghouse 206 can establish a profile for consumer 202 that links an identity (as established by, for example, a variety of physical, tamper-resistant identity documents) to one or more ways of authenticating the user. Thus, consumer 202 can prove that they correspond to an identity profile using any of a variety of authentication techniques, and identity clearinghouse 206 can confirm to institution 204 that the profile corresponds to the identity that consumer 202 is claiming. By breaking up the identity verification process into identity profile establishment and identity profile authentication, streamlined but high-confidence identity verifications can be conducted by institution 204.

In some embodiments, identity profile data may be stored in identity profile data store 208 of identity clearinghouse 206. In order to verify the identity of consumer 202, financial institution 204 can then communicate with identity clearinghouse 206. In other embodiments, identity profile data may be stored in a decentralized data store. For example, identity profiles can be stored in a block chain, distributed hash table, or other decentralized data structure. In such embodiments, financial institution 204 can directly look up the identity profile for consumer 202 and verify their identity. In one such embodiment, identity point data can be stored in the block chain, with identity points digitally signed by the verifying party and encrypted under an identity key. The identity key can, in turn, be stored in the block chain encrypted using an m-of-n key piece protocol, where each key piece corresponds to the hashed form of a single authentication point. Thus, if consumer 202 provides an appropriate number of correct authentication points, financial institution 204 will be able to reconstruct the identity key and access the appropriate identity points to verify the identity of consumer 202.

Figure 3:
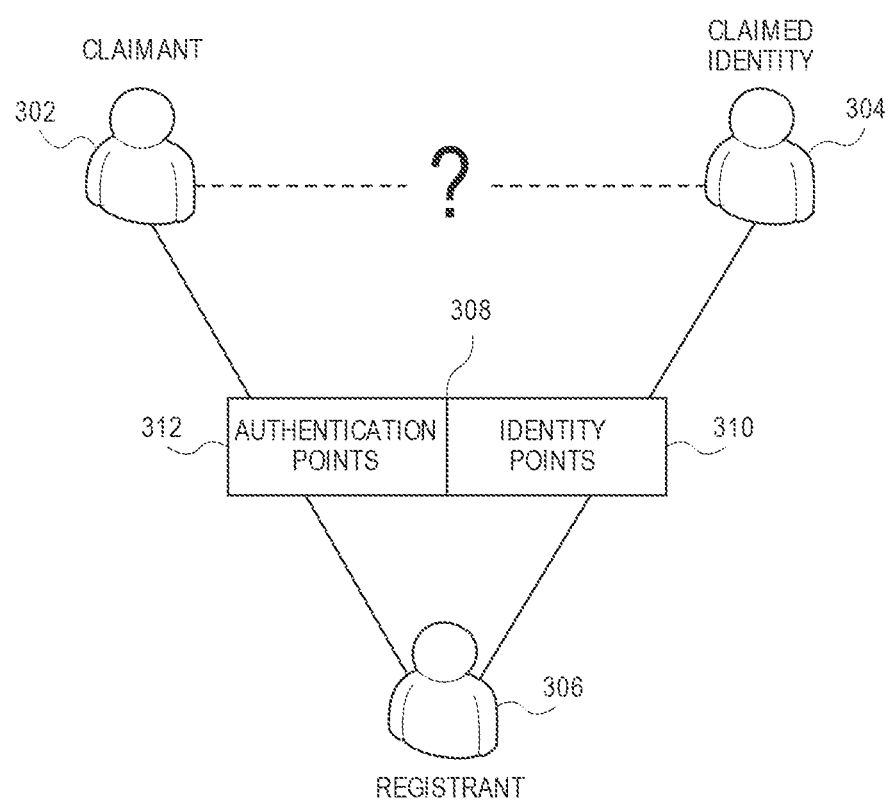
FIG. 3 depicts a schematic representation of the principals in an identity verification.

Turning now to FIG. 3, a schematic diagram of the principals in the identity relationship and the relationships between them is depicted. The basic problem being solved is verifying that claimant 302 actually corresponds to claimed identity 304, as they purport to. Claimant 302 (and, by extension, claimed identity 304) may be a natural person or a juristic entity such as a business. For example, a supplier requesting payment can prove that they are actually the same entity that provided the goods or services being billed, in order to avoid payment fraud.

As another example, claimant 302 may be filing a tax return in the name of claimed identity 304. Broadly speaking, such returns require only minimal authentication information (such as the name and social security number of claimed identity 304). As a result of this weak authentication, a single claimant can file many fraudulent tax returns on behalf of many fraudulently claimed identities. This problem arises particularly in electronic filing scenarios, where claimants cannot present documents to prove their identity. As described above, electronic submissions of scans of these documents do not provide adequate authentication due to the ease of altering electronic images.

To solve this problem, embodiments of the invention break the authentication process into two steps by including a third principal, registrant 306. Registrant 306 can be any entity wishing to claim an identity. Associated with each registrant 306 is an identity profile 308. Identity profile 308, in turn, includes identity points 310 and authentication points 312. As discussed above, identity profile 310 can be stored in identity profile data store 208 of identity clearinghouse 206 (for a centralized authentication model) or in a distributed data store such as a block chain (for a decentralized authentication model). In some embodiments, shadow profiles may be established for known bad actors including, for example, their known biometrics so that authentication attempts by such individuals can be rejected.

Broadly speaking, identity points prove that the registrant is actually associated with claimed identity 304. For example, physical identifying documents such as a driver's license, birth certificate, social security card, utility bill, passport, pay stub, resident alien card, school ID card, military identification, fingerprint card, or any other identifying document or thing. In some embodiments, registrant 306, at the time of registration, goes to a physical facility associated with identity clearinghouse 206 to present the documents to establish identity points 310. For example, in the tax return example above, the registrant can present their identity documents when they visit the office of a tax professional to drop off their tax documents. Alternatively, any trusted body (e.g., a notary public, a post office, or a courthouse) can validate identity documents and allow registrant 306 to create their identity profile.

In addition to identity points 310, identity profile 308 also includes authentication points 312. Broadly, authentication points 312 allow a later claimant to prove that they are the same person (or entity) that registered the identity profile. One type of authentication factor is something consumer 202 knows. Examples of this type include a password or PIN, a pre-established security question (mother's maiden name, third grade teacher, etc.), out-of-wallet questions, a social security number, an email address, a phone number, and any other form of knowledge-based authentication. A second type of authentication factor is something consumer 202 possesses. Examples of this type of authentication factor include a user's cell phone, a hardware authentication token, an RFID card or dongle, and a physical or digital key. A third type of authentication factor is something inherent to consumer 202. Examples of this type of authentication factor include biometrics such as fingerprints, voiceprints, iris patterns, faceprints, hand geometry, signatures, gait patterns, and DNA as well as more basic characteristics such as height, hair and eye color, tattoos, etc. Such biometrics may be timestamped with the time of their capture to ensure that they are current when the transaction is taking place.

Thus, since it may be challenging to directly establish that claimant 302 actually corresponds to claimed identity 304, embodiments of the invention verify first that claimant 302 corresponds to registrant 306 (via authentication points 312) and second that registrant 306 corresponds to claimed identity 304 (via identity points 310). If both of these correspondences can be established with sufficient confidence, than the correspondence between claimant 302 and claimed identity 304 can be established with equivalent confidence.

Figure 4:
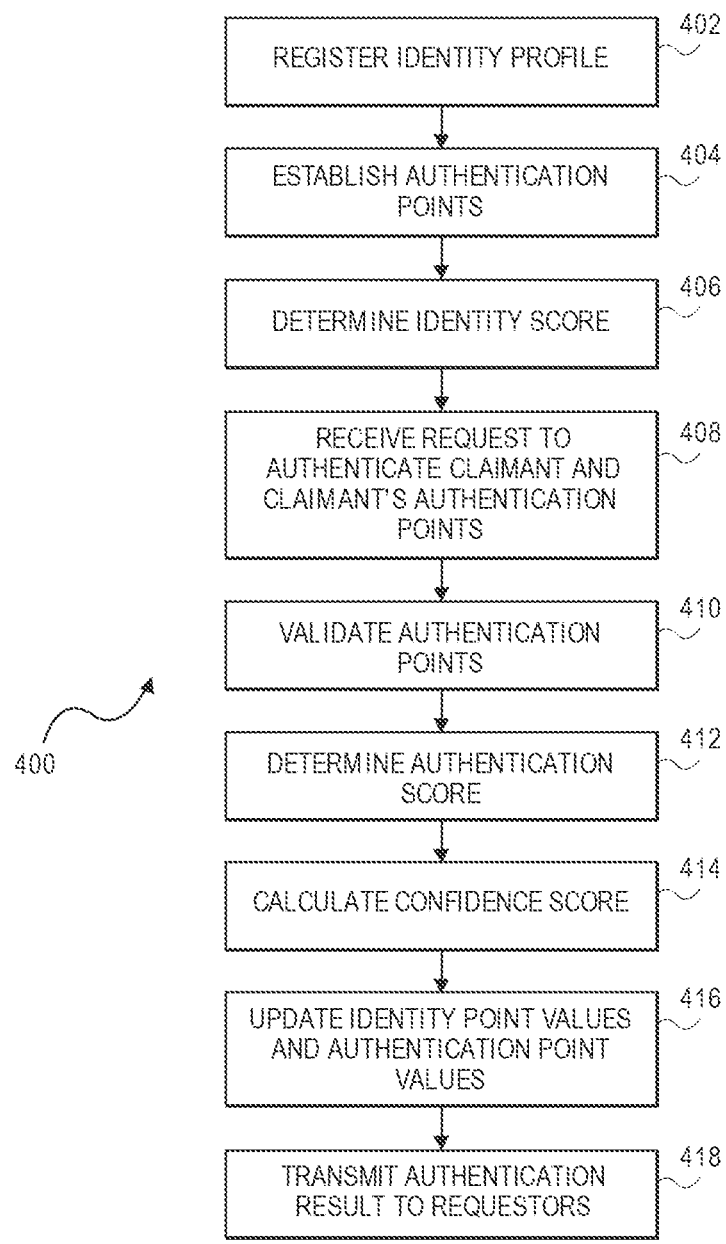
FIG. 4 depicts a flowchart illustrating the operation of a method in accordance with an embodiment of the invention.

Turning now to FIG. 4, a flowchart depicting the operation of a method in accordance with an embodiment of the invention is depicted and referred to by reference numeral 400. Initially, at a step 402, consumer 202 registers with identity clearinghouse 206 to establish an identity profile. In some embodiments, an empty identity profile may be automatically created upon a first authentication attempt, which can subsequently be populated by the claimed identity. In order to populate a profile, consumer 202 presents one or more identity points to identity clearinghouse 206, which stores them in identity profile data store 208. As described above, an identity point is anything that links a registrant to a claimed identity. In some embodiments, authenticated replicas or images for each identifying document are stored with the identity profile. In other embodiments, the identity profile indicates that the registrant presented the document and that it was authenticated, but the document itself is not stored. In still other embodiments, some documents are stored and other documents are flagged as having been presented but not stored. In some embodiments, these documents can be stored in the identity profile using a registration terminal operated by a trusted third party (such as a tax preparer, notary public, clerk of the court, etc.). One of skill in the art will appreciate that the registration terminal, the identity clearinghouse, and the identity terminal may be co-located or geographically dispersed.

Next, at step 404, consumer 202 establishes one or more authentication points for the identity profile. As described above, an authentication point is broadly any technique by which consumer 202 can later confirm to identity clearinghouse 206 that they are the same person who set up the identity profile. Any type of authentication point, now known or later developed is contemplated as being within the scope of the invention. Furthermore, some data points may be both identity points and authentication points. For example, the user may both submit a certified fingerprint card as an identity document and register their fingerprints for subsequent authentication. It is further contemplated that consumer 202 can add, update, or delete identity points and authentication points from their identity profile over time. For example, if the user moves to a different state, then they may update the driver's license stored in their identity profile to reflect their new documents. Similarly, if a user loses their cell phone or has a password compromised they can remove that authenticator from their set of authentication points or update it with a new one.

In some embodiments, an identity score is determined for the consumer at step 406. The identity score broadly measures the likelihood that the identity profile corresponds to the claimed identity. For example, a malicious actor could create an identity profile claiming to be a celebrity using forged identity points. However, such a fake profile would likely have a low identity score due to the difficulty in forging high-quality identity points sufficient to create a high identity score. Generally, a registrant who has provided more (and higher quality) identity points will have a higher identity score. For example, a registrant presenting a utility bill showing their name and address might slightly increase their identity score, while a registrant providing a passport and verifying that their biometrics match those embedded in the passport would significantly increase their identity score. In some embodiments, certain identity points or authentication points may reduce the identity score as well. For example, if the malicious actor ties a cell phone to the identity profile that has been previously used (or is subsequently used) in authenticating fraudulent transactions (for example, under a different identity profile) the association of that phone with the identity profile might reduce the identity score. In embodiments where a decentralized identity profile data store is used, steps 406-416 may be performed by the requestor (e.g., institution 204) rather than by identity clearinghouse 206.

Processing can then continue to step 408, which may take place immediately or significantly after step 406. In some embodiments, step 408 may take place before steps 402-406. At step 408, identity clearinghouse 206 receives, from institution 204, a request to verify the identity of a claimant claiming to be a claimed identity such as that of consumer 202. This request may include any authentication points the claimant has provided. In other embodiments, the request to verify the identity comes from the claimant instead. In still other embodiments, institution 204 and the claimant collaborate to send the request (for example, by each sending part of the necessary information) to identity clearinghouse 206.

In some embodiments, institution 204 may include a confidence level desired before they are willing to proceed with the claimant's transaction. A confidence level may be a threshold score on a predefined scale (for example, from 1 to 100 or from 400 to 850). A confidence level may also be specified by a particular set of documents required by institution 204 to identify consumer 202. For example, the United States Citizenship and Immigration Services requires all new employees to provide certain documents to confirm their employment eligibility. In particular, either a single document from a first list or one document each from a second and third list must be supplied. To replace this verification process, the employer could provide whatever authenticators the potential employee has provided and specify these list requirements as the confidence level. If the identity clearing house confirms that the identity of the potential employee has been verified, then the employer can be assured that the appropriate documents are present in the potential employee's identity profile and that they are accordingly eligible for employment.

As mentioned above, the request may include the authentication points provided by claimant 302. For example it may include a driver's license number for a driver's license presented by consumer 202, or an image of consumer 202 by institution 204, or both. The request may also include an indication that the claimant has presented the authentication points and that institution 204 has verified them, or both the authentication points and an indication that institution 204 has verified them. For example, the request may include a driver's license number for a license presented by consumer 202, together with an indication that the picture on the driver's license matches consumer 202.

In some embodiments, or for some authentication points, the user may affirmatively provide the authentication points. In other embodiments, the authentication points may be automatically provided, or fetched by identity clearinghouse 206. For example, one authentication point may be the location of a smartphone associated with the registrant. The claimant may interact with an identity terminal at institution 204 to provide this information, or the claimant's smartphone may have an app that can be queried by identity clearinghouse 206 (using, for example, a push notification) to provide the information when institution 204 sends the authentication request to identity clearinghouse 206. Alternatively, the claimant may interact with the point-of-sale terminal or their smartphone to provide the authentication data. For example, identity clearinghouse 206 might receive the authentication request and communicate with a smartphone associated with the registrant to activate an application to prompt the user to provide a fingerprint, answer an out-of-wallet question, provide a current photograph of themselves, or provide any other interactive authentication point. In some embodiments, the same identity terminal (stand-alone or integrated into a point-of-sale terminal) is used by both the institution and the claimant to provide authentication points.

Once the various authentication points have been received for the claimant, processing can proceed to step 410, where identity clearinghouse 206 can validate each authentication point. One of skill in the art will appreciate that each authentication point may be validated in a manner specific to that type of authentication point. For example, biometrics (e.g., fingerprints or facial images) may be compared to stored biometric templates, and passwords or PINs may be compared to stored hashed versions. Real-time geolocation of registrant 306 may be compared to a stored location for the point-of-sale terminal associated with institution 204 that is processing the transaction. Some types of authentication points may instead be validated by institution 204. For example, institution 204 may simply confirm that consumer 202 presented an identification card. For other types of authentication point, validation may be split between institution 204 and identity clearinghouse 206. For example, in the case of a physical token which presents a periodically changing code, institution 204 could verify that the consumer 202 presented the token and indicate which code is displayed, while identity clearinghouse 206 could verify that the code presented is the correct one for the token associated with consumer 202. In this manner, each of the authentication points can be classified as "validated" or "invalid." In some embodiments, some authentication points may additionally be classified as "no validation attempted" where validation was unnecessary, impossible, or otherwise not attempted.

Once the authentication points have been validated, processing can proceed to step 412 when the authentication score is determined. Broadly, the authentication score represents the likelihood that a claimant corresponds to the identity profile to which they are attempting to authenticate. Generally, a claimant who provides more validated authentication points will have a higher authentication score, while a claimant who provides fewer, or who provides authentication points which are invalid, will have a lower authentication score. In some embodiments, an authentication point that is invalid will lower the claimant's authentication score more than that authentication point, if validated, would have raised it. In this way, a malicious actor cannot simply guess at a large number of authentication points. In some embodiments, the authentication score increase for authentication points is reduced if those authentication points have been previously validated in rejected authentications, or in successful authentications for transactions subsequently determined to be fraudulent. In some embodiments, the authentication values associated with individual authentication points are added to determine the overall authentication score. In other embodiments, they are averaged to determine the overall authentication score. In still other embodiments, the highest individual score for an authentication point is used as the overall authentication score. Any technique for aggregating the authentication values for individual authentication points is contemplated as being within the scope of the inventions.

Once the authentication score is determined, processing can proceed to step 414, where the confidence score is determined based on the identity score and the authentication score. As described above, the identity score links the registrant to the claimed identity, and the authentication score links the claimant to the registrant. Thus, the final confidence score is broadly the likelihood that the claimant is actually the person they are claiming to be. These relationships are described in greater detail in FIG. 3 above. As one example of calculating the confidence score, the identity score and authentication scores may be expressed as fractions of the maximum respective scores and multiplied to determine the confidence score as a fraction of the maximum confidence score. Thus, for example, if the identity score were 90 (out of a maximum of 100) and the authentication score were 100 (out of a maximum of 120), then the corresponding confidence score would be 75%. This fractional value can then be scaled appropriately: in the above example, if the confidence score is scale from 400 to 850, then the resulting score would be 737.5 (i.e., 75% of the way from 400 to 850). Alternatively, the fractional confidence score may be the smaller of the fractional identity score and fractional authentication score rather than the product. Other algorithms for calculating the confidence score are also contemplated.

In some embodiments, the respective scores associated with identity points and/or authentication points may next be adjusted at step 416 based on the results of the authentication process. For example, if claimant 302 provides one authentication point that is validated and ten invalid authentication points, it may be assumed that claimant 302 is a malicious actor who has discovered the value of a single authentication point. The values associated with that authentication point might then be reduced for subsequent authentication attempts under the assumption that it no longer provides strong authentication. Similarly, if an individual is the subject of identity theft, then the value associated with any compromised credentials in calculating the identity score may be discounted appropriately. In some embodiments, this adjustment is made prior to step 414. In other embodiments, identity point values are adjusted before calculating the confidence score and authentication point values are updated afterwards, or vice versa.

Finally, at step 418, a response including the authentication result is sent to the requestor. In some embodiments, the authentication result includes the confidence score. In other embodiments, the result only indicates whether the authentication succeeded or failed. In some embodiments, identity documents associated with the authenticated identity profile may also be sent to the requestor together with the authentication result.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for authenticating a claimant as a claimed identity, comprising the steps of:
   receiving, from a registrant, a plurality of identity points for the claimed identity and a plurality of authentication points for the registrant,
   wherein the claimed identity corresponds to an individual person;
   establishing, based on the plurality of identity points for the claimed identity and the plurality of authentication points for the registrant, an identity profile linking the registrant to a claimed identity;
   determining, based on the plurality of identity points for the claimed identity, an identity score for the registrant,
   wherein the identity score is determined at least in part based on a number of identity points provided and at least in part based on a type of identity point provided;
   receiving a request to authenticate the claimant,
   wherein the claimant claims the claimed identity, and
   wherein the request includes a plurality of authentication points for the claimant;
   validating the plurality of authentication points for the claimant against the plurality of authentication points for the registrant to determine an authentication score for the claimant,
   wherein the authentication score is determined at least in part based on a number of authentication points provided and a type of authentication point provided;
   determining, based on the authentication score for the claimant and the identity score for the registrant, a confidence score for the claimant,
   wherein the confidence score reflects that likelihood the claimant corresponds to the claimed identity; and
   transmitting a response indicating an authentication result,
   wherein the authentication result is based on the confidence score.

2. The method of claim 1, wherein the identity profile is stored in a distributed data structure.

3. The method of claim 2, wherein the distributed data structure is a block chain.

4. The method of claim 1, wherein the plurality of authentication points for the registrant includes a current location of a smartphone associated with the registrant.

5. The method of claim 1, wherein the plurality of authentication points for the registrant includes a biometric value associated with the registrant.

6. The method of claim 1, wherein a value associated with at least one authentication point for the claimed identity is updated based on the authentication result.

7. The method of claim 1, wherein the authentication result includes the confidence score.

8. One or more non-transitory computer-readable media storing computer-executable instructions that, when executed by a computer, perform a method of authenticating a claimant as a claimed identity, the method comprising the steps of:
   receiving, from a registrant, a plurality of identity points corresponding to the claimed identity and a plurality of authentication points for the registrant,
   wherein the claimed identity corresponds to an individual person;
   storing, in a distributed data store, an identity profile corresponding to the registrant and including the plurality of identity points corresponding to the claimed identity and the plurality of authentication points for the registrant;
   receiving, from a claimant, a plurality of authentication points for the claimant;
   retrieving, from the distributed data store, the identity profile;
   validating at least some of the authentication points for the claimant against corresponding authentication points for the registrant;
   determining, based on the step of validating, an authentication score for the claimant,
   the authentication score determined at least in part based on a number of authentication points validated;
   calculating, based on at least a portion of the identity points for the claimed identity, an identity score for the registrant,
   the identity score determined at least in part based on a number of identity points received form the registrant;
   calculating, based at least in part on the identity score and the authentication score, a confidence score reflecting the likelihood that the claimant corresponds to the claimed identity; and
   authenticating the claimant as the claimed identity based on the confidence score.

9. The media of claim 8, wherein at least some of the plurality of identity points and the plurality of authorization points for the registrant are stored in the distributed data store in encrypted form.

10. The media of claim 8, wherein the plurality of authentication points for the registrant includes a current location of a smartphone associated with the registrant.

11. The media of claim 8, wherein the plurality of authentication points for the registrant includes a biometric value associated with the registrant.

12. The media of claim 8, wherein the distributed data store is a block chain.

13. A system for authenticating a claimant as a claimed identity, comprising:
- a registration terminal;
- an identity clearinghouse; and
- an identity terminal,
- wherein the registration terminal is programmed to:
  - receive at least one authentication point for a registrant and at least one of identity points for the claimed identity,
  - wherein the claimed identity corresponds to an individual person; and
  - transmit the at least one authentication point for the registrant and the at least one identity point for the claimed identity to the identity clearinghouse;
- wherein the identity clearinghouse is programmed to:
  - receive the at least one authentication point for the registrant and the at least one identity point for the claimed identity;
  - store the at least one authentication point for the registrant and the at least one identity point for the claimed identity in an identity data store;
  - receive a request to authenticate a claimant as the claimed identity and at least one authentication point for the claimant;
  - validate the at least one authentication point for the claimant against the at least one authentication point for the registrant to determine an authentication score for the claimant,
  - wherein the authentication score score is determined based at least in part on the type of the validated at least one authentication point;
  - determine, based on the at least one identity point for the claimed identity, an identity score for the registrant,
  - wherein the identity score is determined based at least in part on a type of the at least one identity point;
  - calculate, based on the identity score for the registrant and the authentication score for the claimant, an confidence score reflecting the likelihood that the claimant corresponds to the claimed identity;
  - based on the confidence score, transmit an authentication of the claimant to the identity terminal; and
- wherein the identity terminal is programmed to:
  - receive, at least one authentication point for the claimant;
  - transmit a request to authenticate the claimant including the at least one authentication point to the identity clearinghouse; and
  - receive, from the identity clearinghouse, the authentication of the claimant.

14. The system of claim 13, wherein the registration terminal, the identity clearinghouse, and the identity terminal are geographically dispersed.

15. The system of claim 13, wherein the identity terminal includes a biometric reader to capture a biometric authentication point for the claimant.

16. The system of claim 15, wherein the biometric reader is a fingerprint reader.

17. The system of claim 15, wherein the biometric authentication point is timestamped by the identity terminal.

18. The system of claim 13, wherein the at least one authentication point for the claimant includes a location of a smartphone associated with the registrant.

19. The system of claim 13, wherein the request to authenticate the claimant includes at least one identity point required to authenticate the registrant as the claimed identity.

20. The system of claim 13, further comprising a plurality of registration terminals and a plurality of identity terminals.

* * * * *